(12) United States Patent
Senetar

(10) Patent No.: US 7,906,448 B2
(45) Date of Patent: Mar. 15, 2011

(54) MOVING BED CATALYST REGENERATION APPARATUS WITH INTEGRAL CO OXIDATION ZONE AND METHOD OF USE TO ACCELERATE COKE BURNING

(75) Inventor: John J. Senetar, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/580,753

(22) Filed: Oct. 16, 2009

(65) Prior Publication Data

US 2010/0034718 A1 Feb. 11, 2010

Related U.S. Application Data

(62) Division of application No. 11/116,005, filed on Apr. 27, 2005, now abandoned.

(51) Int. Cl.
- *B01J 38/24* (2006.01)
- *B01J 38/18* (2006.01)
- *B01J 38/20* (2006.01)
- *B01J 38/40* (2006.01)
- *B01J 8/12* (2006.01)

(52) U.S. Cl. .......... 502/48; 502/38; 502/39; 502/42; 502/45; 502/50; 422/233

(58) Field of Classification Search .......... 422/233; 502/38, 39, 45, 48, 50, 42

See application file for complete search history.

(56) References Cited

U.S. PATENT DOCUMENTS

| 4,010,094 A | * | 3/1977 | McKinney | 208/164 |
| 4,977,119 A | * | 12/1990 | Koves | 502/48 |
| 5,053,371 A | * | 10/1991 | Williamson | 502/37 |

* cited by examiner

*Primary Examiner* — Stanley Silverman
*Assistant Examiner* — Diana J Liao
(74) *Attorney, Agent, or Firm* — Mark Goldberg

(57) ABSTRACT

A combination of moving bed regeneration technology and CO oxidation technology is used in a novel moving bed regeneration apparatus containing an integral CO oxidation zone to solve the problem of regenerating a coke-containing catalyst that does not contain a CO oxidation promoter without generating an effluent flue gas stream containing hazardous and undesired amounts of CO. The CO oxidation zone is located in the flue gas collection zone within the moving bed regeneration apparatus and functions autogenously to eliminate the CO hazard by oxidizing CO to $CO_2$ with a portion of the unreacted oxygen withdrawn from the coke combustion zone of the moving bed regeneration apparatus.

5 Claims, 2 Drawing Sheets

MOVING BED CATALYST REGENERATION APPARATUS WITH INTEGRAL CO OXIDATION ZONE AND METHOD OF USE TO ACCELERATE COKE BURNING

CROSS-REFERENCE TO RELATED APPLICATION

This application is a Division of copending application Ser. No. 11/116,005 filed Apr. 27, 2005, the contents of which are hereby incorporated by reference in its entirety.

FIELD OF THE INVENTION

The present invention relates generally to the use of a novel moving bed apparatus containing an integral CO oxidation zone for regenerating particles of a coke-containing catalyst that does not contain a CO oxidation promoter in order to provide a solution to a problem that has plagued the contemplated use of moving bed technology for various applications such as one involving regeneration of a dual-function catalyst used in the selective conversion of an oxygenate feed material to propylene (OTP) process. The novel apparatus of the present invention more specifically relates to a moving bed regeneration apparatus containing an integral CO oxidation zone which effectively, safely and efficiently solves the problem of generation a flue gas containing hazardous and undesired amounts of CO from the moving bed regeneration apparatus of the prior art when it is applied to any coke-containing catalyst system that does not contain a CO oxidation promoter. Coupling of a CO oxidation zone with traditional moving bed regeneration technology enables the resulting integral moving bed regeneration apparatus to autogenously eliminate the CO hazard by oxidizing unacceptable amounts of CO contained in the flue gas to $CO_2$ with a portion of the unreacted oxygen withdrawn from the coke combustion zone located within the apparatus of the present invention, thereby eliminating the risk of contamination of the environment if this hazardous gas stream were to be transported to a CO oxidation zone located outside of the moving bed apparatus. In addition the present invention eliminates the necessity for a capital investment for an additional CO oxidation reactor and the necessary controls and sensors for its successful operation if in fact the hazardous flue gas stream had to be treated in a vessel downstream from the moving bed regeneration apparatus. The key to the present invention involves recognition that when a coke containing-catalyst that does not contain a CO oxidation promoter is regenerated in a moving bed apparatus the efficiency of the oxygen utilization in the coke combustion zone of the apparatus is low enough such that an integral CO oxidation zone can be situated in the flue gas collection zone within the moving bed regeneration apparatus. This integral CO oxidation zone then sees a CO-containing flue gas stream at a relatively high temperature due to the exothermic nature of the coke combustion reaction. Positioning the CO oxidation zone in this manner provides an input flue gas stream to the CO oxidation zone that is at a temperature and contains sufficient oxygen so that the CO oxidation catalyst in the flue gas collection zone can autogenously operate to eliminate this hazardous material from the flue gas stream that is ultimately withdrawn from the integral apparatus of the present invention.

When at least a portion of the effluent flue gas stream is used as a diluent for the combustion gas stream which is charged to the moving bed regeneration apparatus (which is the typical case for a commercial unit) in order to control the oxygen content at a relatively low level and to provide a heat sink for at least some of the heat of combustion liberated in the coke combustion zone, the presence of hazardous amounts of CO in this stream can act to retard and/or inhibit the coke combustion reactions. An additional advantage of the present invention in this situation is therefore that the coke combustion reactions are accelerated relative to what they would be in the absence of the present invention.

BACKGROUND OF THE INVENTION

A major portion of the worldwide petrochemical industry is concerned with the production of light olefin materials and their subsequent use in the production of numerous important chemical products via polymerization, oligomerization, alkylation and the like well-known chemical reactions. Light olefins include ethylene, propylene and mixtures thereof. These light olefins are essential building blocks for the modern petrochemical and chemical industries. The major source for these materials in present day refining is the steam cracking of petroleum feeds. For various reasons including geographical, economic, political and diminished supply considerations, the art has long sought a source other than petroleum for the massive quantities of raw materials that are needed to supply the demand for these light olefin materials. In other words, the holy grail of the R & D personnel assigned to work in this area is to find a way to effectively and selectively use alternative feedstocks for this light olefin production application, thereby lessening dependence of the petrochemical industry on petroleum feedstocks. A great deal of the prior art's attention has been focused on the possibility of using hydrocarbon oxygenates and more specifically methanol or dimethylether (DME) as a prime source of the necessary alternative feedstock. Oxygenates are particularly attractive because they can be produced from such widely available materials as coal, natural gas, recycled plastics, various carbon waste streams from industry and various products and by-products from the agricultural industry. The art of making methanol and other oxygenates from these types of raw materials is well established and typically involves the use of one or more of the following procedures: (1) manufacture of synthesis gas by any of the known techniques typically using a nickel or cobalt catalyst in a steam reforming step followed by the well-known methanol synthesis step using relatively high pressure with a copper-based catalyst; (2) selective fermentation of various organic agricultural products and by-products in order to produce oxygenates; or (3) various combinations of these techniques.

Given the established and well-known technologies for producing oxygenates from alternative non-petroleum raw materials, the art has focused on different procedures for catalytically converting oxygenates such as methanol into the desired light olefin products in order to make an oxygenate to olefin (OTO) process. These light olefin products that are produced from non-petroleum based raw materials must of course be available in quantities and purities such that they are interchangeable in downstream processing with the materials that are presently produced using petroleum sources. Although many oxygenates have been discussed in the prior art, the principal focus of the two major routes to produce these desired light olefins has been on methanol conversion technology primarily because of the availability of commercially proven methanol synthesis technology. A review of the prior art has revealed essentially two major techniques that are discussed for conversion of methanol to light olefins (MTO). The first of these MTO processes is based on early German and American work with a catalytic conversion zone containing a zeolitic type of catalyst system. Representative of the early German work is U.S. Pat. No. 4,387,263 which was filed in May of 1982 in the U.S. without a claim for German priority. This '263 patent reports on a series of experiments with methanol conversion techniques using a ZSM-5 type of catalyst system wherein the problem of DME by-product recycle is a major focus of the technology disclosed. Although good yields of ethylene and propylene were reported in this '263 patent, they unfortunately were accompanied by substantial formation of higher aliphatic and aromatic hydrocarbons which the patentees speculated might be useful as an engine fuel and specifically as a gasoline-type of material. In order to limit the amount of this heavier material that is produced, the patentees of the '263 patent propose to limit conversion to less than 80% of the methanol charged to the MTO conversion step. This operation at lower conversion levels necessitated a critical assessment of means for recovering and recycling not only unreacted methanol but also substantial amounts of a DME intermediate product. The focus then of the '263 patent invention was therefore on a DME and methanol scrubbing step utilizing a water solvent in order to efficiently and effectively recapture the light olefin value of the unreacted methanol and of the intermediate reactant DME.

This early MTO work with a zeolitic catalyst system was then followed up by the Mobil Oil Company who also investigated the use of a zeolitic catalyst system like ZSM-5 for purposes of making light olefins. U.S. Pat. No. 4,587,373 is representative of Mobil's early work and it acknowledged and distinguished the German contribution to this zeolitic catalyst based MTO route to light olefins.

Primarily because of an inability of this zeolitic MTO route to control the amounts of undesired $C_4^+$ hydrocarbon products produced by the ZSM-5 type of catalyst system, the art soon developed a second MTO conversion technology based on the use of a non-zeolitic molecular sieve catalytic material. This branch of the MTO art is perhaps best illustrated by reference to UOP's extensive work in this area as reported in numerous patents of which U.S. Pat. Nos. 5,095,163; 5,126, 308 and 5,191,141 are representative. This second approach to MTO conversion technology was primarily based on using a catalyst system comprising a non-zeolitic molecular sieve, generally a metal aluminophosphate (ELAPO) and more specifically a silicoaluminophosphate molecular sieve (SAPO), with a strong preference for a SAPO species that is known as SAPO-34. This SAPO-34 material was found to have a very high selectivity for light olefins with a methanol feedstock and consequently very low selectivity for the undesired corresponding light paraffins and the heavier materials. This ELAPO catalyzed MTO approach is known to have at least the following advantages relative to the zeolitic catalyst route to light olefins: (1) greater yields of light olefins at equal quantities of methanol converted; (2) capability of direct recovery of polymer grade ethylene and propylene without the necessity of the use of extraordinary physical separation steps to separate ethylene and propylene from their corresponding paraffin analogs; (3) sharply limited production of by-products such as stabilized gasoline; (4) flexibility to adjust the product ethylene-to-propylene weight ratios over the range of 1.5:1 to 0.75:1 by minimal adjustment of the MTO conversion conditions; and (5) significantly less coke make in the MTO conversion zone relative to that experienced with the zeolitic catalyst system.

The classical OTO technology produces a mixture of light olefins primarily ethylene and propylene along with various higher boiling olefins. Although the classical OTO process technology possesses the capability of shifting the major olefin product recovered therefrom from ethylene to propylene by various adjustments of conditions maintained in the reaction zone, the art has long sought an oxygenate to propylene (OTP) technology that would provide better yields of propylene relative to the classical OTO technology. The driving force for this shift in emphasis towards propylene is the growth rate of the propylene market versus the growth rate of the ethylene market. The existing sources of propylene production in the marketplace are primarily based on conventional steam cracking of naphtha, LPG streams, propane streams and the like. Another major existing source of propylene is the olefins that are produced in a fluid catalytic cracking (FCC) hydrocarbon conversion process in the modern day refinery. Because the basic raw material used in an OTO process is derived from natural gas which is widely available particularly in remote areas of the world but unfortunately markets for this gas are typically not conveniently available near the location of the remote gas fields. These remote gas fields tend to be quite large and because of the relatively well-developed technology for converting natural gas to methanol and other oxygenates are viewed by those skilled in this art and being the next logical source of large-scale propylene production provided a commercially acceptable OTP process can be established which possesses intrinsic high selectivity for the desired propylene product.

Workers at Lurgi Oel Gas Chemie GmbH have recently announced a new fixed bed methanol to propylene (MTP) process which according to Lurgi offers the potential to satisfy the art's thirst for a propylene selective OTO type of process. It appears that the basic flow scheme and technical details of the Lurgi process offering in this field have been disclosed in U.S. Pat. No. 7,015,369 and describes a process for selectively producing propylene from a feedstock which comprises methanol and/or DME. Analysis of the two figures attached to this patent publication make it clear that Lurgi contemplates a reactor flow configuration for the oxygenate to propylene (OTP) synthesis portion of its flow scheme wherein three reactors are utilized with a steam diluent and fixed beds of oxygenate conversion catalysts in a parallel flow arrangement with respect to the oxygenate feed. The reactors are connected in a serial flow arrangement with respect to the effluents of the first reactor and the second reactor. The dual function OTP catalyst system taught as being useful in this flow scheme is rather narrowly defined in paragraph [0005] of this patent publication as a pentasil-type (i.e. ZSM-5 or ZSM-11 type) having an alkali content less than 380 ppm and a zinc oxide content of less than 0.1 wt-% coupled with a restriction on cadmium oxide content of the same amount. The teachings with respect to this catalyst are derived from a European patent, EP 0448000, filed by Sud Chemie and Lurgi claiming priority from an original German application that was filed in March of 1990. Thus the catalyst contemplated for use in Lurgi's flow scheme is well known to those skilled in this art. According to Lurgi's marketing presentation, the on-stream portion of the process cycle for this MTP process is expected to be 500 to 700 hours before in situ regeneration becomes necessary. (See Rothaemel et al. "Demonstrating the New Methanol to Propylene (MTP) Process" presented to the ERTC Petrochemical Conference in March of 2003 at Paris, France). The activity-stability of the MTP catalyst in this Lurgi presentation show a significant drop in conversion activity over the first five cycles with each cycle being terminated after the oxygenate conversion level drops to about 94% to 95% of the oxygenate feed. Lurgi also contemplates that at the end of the cycle when the conversion has dropped to a level of about 94% of the equivalent in the feed that the reactors will be shut down and the catalyst regenerated in situ using an air/nitrogen mixture to burn off the detrimental coke deposits.

In order to substantially improve the fixed bed OTP technology of the prior art, UOP has recently embarked on a program to apply classical moving bed technology to the fixed bed OTP process of the prior art. The term "moving bed technology" is well understood by those of ordinary skill in the chemical engineering art to mean that particles of the OTP catalyst move through the reaction zone as well as the associated regeneration zone in a compact, non-fluidized bed driven primarily by the action of gravity. As part of this program UOP has focused on using moving bed regeneration technology to regenerate one or more of the known OTP catalyst systems of the prior art. These OTP catalyst systems are required in the prior art processes such as the one proposed by Lurgi to be dual-functional in the sense that they must be able to catalyze both the OTP reactions and the olefin interconversion reactions necessary to convert $C_2$ and $C_4^+$ olefins to the desired propylene product. The known dual-function catalysts that can be applied to this OTP service are characterized primarily by the presence of a suitable molecular sieve and the absence of a metallic functionality. This lack of a metallic functionality leads to the problem addressed by the present invention when an attempt is made to apply the commercially proven annular moving bed regeneration technology to coked catalysts having a composition similar to such an OTP catalyst system. UOP's contributions to the art of moving bed regeneration technology started at least as early as 1972 with the issuance of U.S. Pat. No. 3,652,231 which disclosed two versions of a novel apparatus for use in regenerating coke-containing catalyst systems. In particular the annular moving bed system shown in the apparatus of FIG. 3 of this '231 patent soon became the benchmark for the moving bed regeneration art in the petroleum conversion industry. The teachings of this '231 patent with respect to the type of catalyst systems that could be regenerated therein are however limited in every case to a catalyst system that contains a metallic functionality that is a known CO oxidation promoter and thus the problem addressed by the present invention was not recognized at the time commercial embodiments of the moving bed regeneration art crystallized. This situation was also true in the subsequently issued apparatus patents with respect to the novel moving bed apparatus that was initially commercialized by UOP. These early apparatus embodiments can be found in U.S. Pat. Nos. 3,647,680 and 3,692,496. There were many subsequent improvements and embellishments made to this area of moving bed regeneration technology which can be found in, for example: U.S. Pat. Nos. 3,981,824; 4,094,814; 4,578,370; 5,034,117 and 6,133,183. All of these secondary patents as well as many others that could be cited addressed various methods for improving the performance of moving bed regeneration technology but in all cases the catalyst systems that were taught in this prior art for this application of moving bed regeneration technology also contained a metal functionality which acted as an inherent CO oxidation promoter. The art on the application of moving bed regeneration technology to coke-contaminated catalyst is thus focused to a large extent on the problem of regenerating a catalyst system that contains a metal functionality which under the conditions prevailing in the moving bed regeneration zone acts in the first instance to oxidize any CO products of the principal coke burning reactions to $CO_2$ and thus the production of a hazardous flue gas stream from the moving bed regeneration apparatus described in this line of the prior art was not observed and recorded. It is thus clear that the application of moving bed regeneration technology as it has been perfected in the body of the prior art cited above did not identify the problem addressed by the present invention, much less provide a solution therefore.

UOP has diligently pursued the objective of substantially improving the fixed bed OTP technology contributed by Lurgi to the prior art using moving bed technology as the principal thrust of its creative effort. UOP filed a series of applications directed to inventions concerning the ramifications of the application of moving bed technology to this application focused primarily on the reactor side of the technology rather than the regeneration side. UOP's contributions in this area of the art include, inter alia, U.S. Pat. Nos. 7,371,915; 7,371,916; 7,405,337; and 7,408,092. All of the teachings of these UOP patents are specifically incorporated herein by reference.

During the course of UOP's investigation of the application of moving bed technology to the problem of regenerating coke-deactivated catalysts of the prior art, it soon became evident that there existed a problem that had not been adequately addressed in the prior art. In a nutshell the problem that surfaced during the course of this investigation was the fact that the application of moving bed regeneration technology as developed in the line of prior art discussed above to regeneration of coke-containing catalyst systems that do not contain a CO oxidation promoter produced an effluent flue gas stream that contained unacceptable and hazardous levels of CO. The problem then addressed by the present invention is to modify the commercially proven moving bed regeneration apparatus that is taught in this line of prior art to enable the production of an effluent flue gas stream therefrom which does not contain hazardous levels of CO when it is applied to the regeneration of coke-containing catalysts that do not contain a CO oxidation promoter such as, for example, OTP catalysts.

Careful investigation of the origin of the undesired CO by-product production in the combustion zone of a moving bed regenerator when it is used to regenerate coke-containing catalysts like the dual-functional OTP catalyst of primary interest to the present invention has led the present inventor to discern that the problem is primarily attributable to the absence of a metallic functionality in these catalyst systems such as the dual-function OTP catalyst systems. The present invention thus envisions a solution to this problem of production of a flue gas stream containing undesired and hazardous amounts of CO from conventional moving bed regeneration apparatus by modifying the moving bed regeneration apparatus characterized in the line of prior art analyzed above by integrating a CO oxidation zone into the flue gas collection zone of the preferred annular moving bed regeneration apparatus disclosed therein in order to eliminate the CO hazard by selectively and catalytically oxidizing CO to $CO_2$ with a portion of the unreacted oxygen withdrawn from the coke combustion zone of the moving bed regeneration apparatus. The principal advantages associated with this solution to this hazardous flue gas problem are: 1) the integral oxidation zone functions autogenously to produce an acceptable effluent flue gas stream without the necessity of any particular command and control provisions; 2) there is no necessity to contaminate the coke-containing dual-function catalyst that is being subjected to regeneration with an undesired CO oxidation promoter that can compromise or inhibit its performance when it is returned to the reactor side of the unit; 3) there is no risk of environmental contamination since the hazardous material does not leave the modified apparatus; and 4) if a portion of the resulting effluent flue gas stream is used as a diluent in the combustion gas stream charged to the coke combustion zone of the regeneration unit then the coke combustion reactions are not inhibited as they would be by the presence of substantial amounts of CO in the absence of the present invention.

SUMMARY OF THE INVENTION

The primary objective of the present invention is then to provide a realistic and technically feasible solution to the problem of undesired production of an effluent flue gas stream containing hazardous amounts of CO when traditional moving bed regeneration technology is applied to the task of regenerating or reactivating a coke-containing catalyst system that does not contain a CO oxidation promoter. A secondary objective is to provide a solution to this problem of generating a hazardous effluent flue gas stream when applying traditional moving bed regeneration technology to regenerate or reactivate a coke-containing catalyst system that does not contain a CO oxidation promoter where the solution does not involve the withdrawal of a hazardous waste stream from the moving bed regeneration apparatus with subsequent risk of contamination of the environment when this flue gas stream is treated and/or vented in downstream processing. Still another objective is to provide a solution to this hazardous flue gas production problem which functions autogenously without the need of any elaborate command and control system to control an auxiliary CO oxidation zone and/or without the necessity of contaminating the coke-containing catalyst system charged thereto with an undesired amount of a metallic ingredient that can adversely interfere with its reactor side performance.

In one embodiment then, the present invention is a novel moving bed apparatus for regenerating particles of a coke-contaminated catalyst that does not contain a CO oxidation promoter and for producing an effluent flue gas stream therefrom that is essentially free of hazardous amounts of CO. The instant apparatus comprises a vertically elongated cylindrical confined regeneration vessel having in the upper region thereof an inner cylindrical screen and an outer cylindrical screen concentrically and vertically situated around the axis thereof to form an annular combustion zone for holding a moving bed of the coke-containing catalyst particles charged thereto for regeneration. The holes in the inner and outer cylindrical screens are sized to retain the particles of the catalyst in the annular combustion zone while allowing contact with a radially flowing combustion gas. In addition, the outer screen is spaced apart from the inner wall of said vessel to form an annular-shaped combustion gas distribution zone and the inner screen is of a diameter sufficient to define a flue gas collection zone in the interior space thereof. A cylindrical regenerated catalyst disengagement zone is situated in the lower region of the regeneration vessel and has a diameter not greater than the diameter of the outer screen and is in open communication with the lower end of said annular combustion zone to form a cylindrically shaped moving bed of regenerated catalyst particles that is not in direct fluid communication with the combustion gas distribution zone. At least one coked catalyst inlet conduit in open communication with the upper region of said annular combustion zone is situated in the upper region of the regeneration vessel. Similarly at least one primary combustion gas inlet conduit in fluid communication with the combustion gas distribution zone is located in the upper region of the regeneration vessel. A regenerated catalyst outlet conduit is situated in the bottom region of the regenerated catalyst disengagement zone and provides a means for withdrawing particles of regenerated catalyst from the moving bed regeneration apparatus. A CO oxidation zone containing a catalytically effective amount of a CO oxidation catalyst is situated in the upper region of the flue gas collection zone and has at least one inlet in fluid communication with said flue gas collection zone. Lastly an effluent flue gas outlet conduit is situated in upper region of the regeneration vessel in fluid communication only with the CO oxidation zone and is adapted to provide an exclusive flue gas outlet flow path that allows essentially all of the CO-containing flue gas generated in the coke combustion zone to traverse the CO oxidation zone and to produce an effluent flue gas stream that is essentially free of hazardous amounts of CO.

A second embodiment of the apparatus of the present invention involves the moving bed regeneration apparatus of the first embodiment wherein the difference in diameter between the outer and inner screens is sufficient to provide a moving bed depth of coke-containing catalyst of about 15.2 to 45.7 cm (6 to 18 in).

A third embodiment of the apparatus of the present invention comprises the moving bed regeneration apparatus as described above in the first or second embodiments wherein an imperforate ring plate is situated in the middle region of the combustion gas distribution zone, thereby dividing this distribution zone into upper and lower sections that are not direct fluid communication. The primary combustion gas inlet is adapted to provide fluid communication only with the upper section of the resulting divided combustion gas distribution zone and at least one secondary combustion gas inlet is provided in fluid communication with the lower section of the resulting divided combustion gas distribution zone, thereby providing a moving bed regeneration apparatus that has two stages of coke combustion.

Another embodiment involves the moving bed regeneration apparatus as described above in the first, second or third embodiments wherein the CO oxidation catalyst is a honeycomb ceramic or honeycomb metallic monolith coated with a surface layer containing a catalytically effective amount of a CO oxidation promoter or wherein the CO oxidation catalyst comprises a fixed bed of catalyst particles comprising a combination of catalytically effective amounts of a CO oxidation promoter with a porous carrier material.

Still another embodiment involves a moving bed regeneration apparatus as described in any of the previous embodiments wherein the coke-containing catalyst charged thereto through the coked catalyst inlet conduit contains either a zeolitic molecular sieve having a structure corresponding to ZSM-5 or ZSM-11 or this catalyst contains an ELAPSO molecular sieve having a structure corresponding to SAPO-34 or this any catalyst contains a mixture of these materials. In all cases, the coke-containing catalyst charged to the moving bed regeneration apparatus of the present invention does not contain a metallic functionality capable of promoting CO combustion.

A method embodiment of the present invention for continuously regenerating particles of a coke-containing catalyst that does not contain a CO oxidation promoter involves the use of the moving bed regeneration apparatus defined above in the first embodiment and the following steps. The first step comprises charging particles of the coke-containing catalyst to the coked catalyst inlet conduit at a rate that corresponds to a residence time in the annular combustion zone sufficient to burn off 50 to 100% of the coke deposits. The second step involves passing a combustion gas stream containing about 0.5 to 2.0 vol-% oxygen in admixture with inert gases into the primary combustion gas inlet conduit at a rate sufficient to provide sufficient oxygen to burn the specified amount of coke off the catalyst charged to the combustion zone. The third step comprises distributing the primary combustion gas stream in the combustion gas distribution zone and passing the combustion gas into the annular combustion zone so that it flows radially across the moving bed of coke-containing catalyst at coke combustion conditions including a temperature of about 350° to 650° C. or higher sufficient to sustain coke combustion. The fourth step then involves withdrawing a flue gas stream containing undesired amounts of CO from the annular coke combustion zone into the flue gas collection zone and passing substantially all of the resulting CO-containing flue gas into the inlet of the CO oxidation zone and therein contacting the CO-containing flue gas with the CO oxidation catalyst at CO oxidation conditions effective to convert at least 95 mol-% of the entering CO to $CO_2$ and to form an effluent flue gas stream containing only innocuous amounts of CO. This effluent flue gas stream is then withdrawn from the regeneration vessel via the flue gas effluent outlet conduit. The last step then involves withdrawing regenerated catalyst particles from the annular combustion zone and passing them into the disengagement zone where they are disengaged from direct contact with the radially flowing combustion gas and subsequently recovering regenerated catalyst particles from the regenerated catalyst outlet conduit.

Another method embodiment for continuously regenerating particles of a coke-containing catalyst that does not contain a CO oxidation promoter uses the moving bed apparatus defined above in the first embodiment and the specific steps specified above in the first method embodiment with the following modifications. After the effluent flue gas stream is withdrawn via the flue gas outlet conduit it is divided into two portions and the first portion is vented in an amount sufficient to remove the net combustion products. The second portion of this effluent flue gas stream is pressurized in a suitable compressor means to a pressure sufficient to overcome pressure drop in the moving bed regeneration apparatus and the resulting pressurized second portion is cooled in a cooling means and passed through a drying means to remove at least 50% or more of the water contained therein. The resulting dried second portion of the flue gas stream is then admixed with an air stream in an amount sufficient to raise the oxygen content thereof to a value of about 0.5 to 2.0 wt-% and the resulting cooled, dried and oxygen-enriched gas stream is recycled to the primary combustion gas inlet conduit of the moving bed regeneration apparatus to form a flue gas circulation circuit and to provide the necessary combustion gas stream used therein.

Other objects, embodiments, advantages and features of the present invention will be clear to somebody of ordinary skill in the chemical engineering art from a detailed examination of the following description of the invention as well as the information contained in the attached drawings.

DETAILED DESCRIPTION OF THE INVENTION

Figure 1:
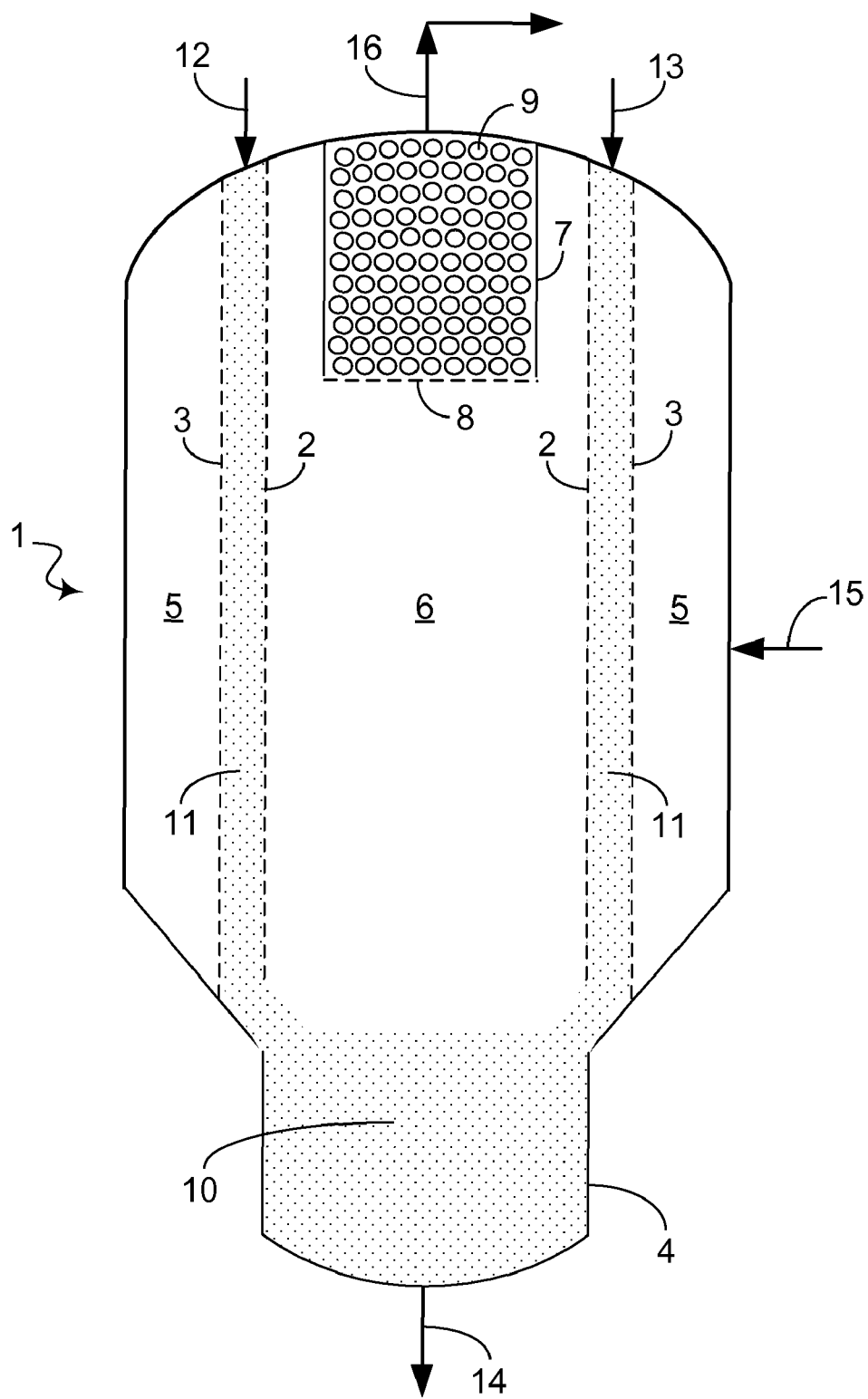
FIG. 1 is a sectional and elevational view of a preferred form of the moving bed regeneration apparatus of the present invention which shows the coke combustion zone operating in a single stage embodiment.

The coke-containing catalyst that is charged to the novel moving bed regeneration apparatus and method of the present invention is broadly characterized as one that does not contain a catalytically effective amount of a CO oxidation promoter and does contain one or more types of acidic sites that produce coke (i.e. carbonaceous deposits produced by condensation, polymerization, hydrogen transfer reactions and the like reactions) which accumulate on the active sites on the catalyst during use on the reactor side of the unit, thereby deactivating the catalyst and requiring regeneration or reactivation in order to sustain an additional cycle on the reactor side of the unit. A leading example of the type of catalyst that can be charged to the novel regeneration apparatus of the present invention is one designed to catalyze the set of reactions that are necessarily performed when an oxygenate reactant is selectively converted to propylene and to also catalyze the set of the olefin interconversion reactions necessary to convert $C_2$ and $C_4^+$ olefins by-products to propylene. This type of catalyst is characterized herein as being "dual-functional" meaning that it possesses the capability of catalyzing both of these sets of reactions. Any of the catalytic materials known to the art that have the capability to catalyze coke-forming reactions are suitable ingredients for use in the catalyst system regenerated with the novel moving bed apparatus and method of the present invention. The preferred coke-containing catalyst contains a molecular sieve as the active ingredient and more specifically the molecular sieve has relatively small pores. The preferred small pore molecular sieves are defined as having pores at least a portion, preferably a major portion, of which have an average effective diameter characterized such that the adsorption capacity (as measured by the standard McBain-Bakr gravimetric adsorption method using given adsorbate molecules) shows good adsorption of oxygen (average kinetic diameter of about 0.346 nm) and negligible adsorption of isobutane (average kinetic diameter of about 0.5 nm). More preferably the average effective diameter is characterized by good adsorption of xenon (average kinetic diameter of about 0.4 nm) and negligible adsorption of isobutane, and most preferably, by good adsorption of n-hexane (average kinetic diameter of about 0.43 nm) and negligible adsorption of isobutane. Negligible adsorption of a given adsorbate is adsorption of less than three percent by weight of the catalyst whereas good adsorption is an amount over this cut-off value in this test. Certain of the molecular sieves useful in the present invention have pores with an average effective diameter of less than 5 Å. The average effective diameter of the pores of preferred catalysts is determined by measurements described in D. W. Breck, ZEOLITE MOLECULAR SIEVES by John Wiley & Sons, New York (1974), hereby incorporated by reference in its entirety. The term "effective diameter" is used to denote that occasionally the pores are irregularly shaped, e.g., elliptical, and thus the pore dimensions are characterized by the molecules that can be adsorbed rather than the actual dimensions. Preferably, the small pore catalysts have a substantially uniform pore structure, e.g., substantially uniformly sized and shaped pore. Suitable catalysts may be chosen from among zeolitic molecular sieves and non-zeolitic molecular sieves.

Zeolitic molecular sieves in the calcined form may be represented by the general formula:

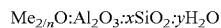

where Me is a cation, x is the framework $SiO_2$ to $Al_2O_3$ ratio and has a value from about 2 to infinity, n is the cation valence and y has a value of about 2 to 100 or more and more typically about 2 to 25.

Zeolites which may be used include chabazite—also referred to as Zeolite D, clinoptilolite, erionite, ferrierite, mordenite, Zeolite A, Zeolite P, ZSM-5, ZSM-11, and MCM-22. Zeolites having a high silica content (i.e., those having framework silica to alumina ratios greater than 100 and typically greater than 150 with good results achieved at a silica to alumina mole ratio of about 150:1 to 800:1) are especially preferred. One such high silica zeolite having the structure of ZSM-5 is silicalite, as the term used herein includes both the silicapolymorph disclosed in U.S. Pat. No. 4,061,724 and also the F-silicate disclosed in U.S. Pat. No. 4,073,865, both of which are hereby incorporated by reference. The preferred zeolites for use in the present invention have the structure of ZSM-5 or ZSM-11. Best results are obtained with ZSM-11 or ZSM-5 or silicalite or a mixture thereof. When these preferred zeolites are used in the coke-containing catalyst, it is preferred that they have a silica to alumina framework mole ratio of about 150:1 to 800:1 with best results obtained at a silica to alumina framework mole ratio of about 400:1 to 600:1.

The most preferred zeolitic coke-containing catalyst charged to the present invention is a zeolite having the structural configuration of ZSM-5 or ZSM-11, sometimes in the literature referred to as having a "pentasil-type" structure. A good example of this type of dual-function catalyst is disclosed in U.S. Pat. No. 7,015,369, the teachings of which are incorporated herein by reference. A borosilicate zeolite having the ZSM-5 or ZSM-11 structural configuration is disclosed in U.S. Pat. No. 4,433,188, the teachings of which are incorporated herein by reference. The dual-function use of a ZSM-5 catalyst system is disclosed in U.S. Pat. No. 4,579,999 wherein a methanol to olefin conversion zone is also charged with a recycle stream containing ethylene and a separate olefin-rich $C_5^+$ gasoline stream in order to increase the yield of $C_3$ to $C_4$ olefins in the first stage MTO reaction zone disclosed therein. This '999 patent contains a good disclosure of the dual-function use of a ZSM-5 catalyst system and is specifically incorporated herein by reference. The use of a zeolitic catalyst having the mordenite structural configuration is specifically disclosed in GB-A-2171718. All of the teachings of this '718 published patent application are specifically incorporated herein by reference.

Non-zeolitic molecular sieves include molecular sieves which have the proper effective pore size and are embraced by an empirical chemical composition, on an anhydrous basis, expressed by the empirical formula:

$(EL_xAl_yP_z)O_2$ where EL is an element selected from the group consisting of silicon, magnesium, zinc, iron, cobalt, nickel, manganese, chromium and mixtures thereof, x is the mole fraction of EL and is at least 0.005, y is the mole fraction of aluminum and is at least 0.01, z is the mole fraction of phosphorous and is at least 0.01 and x+y+z=1. When EL is a mixture of metals, x represents the total amount of the element mixture present. Preferred elements (EL) are silicon, magnesium and cobalt with silicon being especially preferred.

The preparation of various ELAPOs are well known in the art and may be found in U.S. Pat. No. 5,191,141 (ELAPO); U.S. Pat. No. 4,554,143 (FeAPO); U.S. Pat. No. 4,440,871 (SAPO); U.S. Pat. No. 4,853,197 (MAPO, MnAPO, ZnAPO, CoAPO); U.S. Pat. No. 4,793,984 (CAPO); U.S. Pat. Nos. 4,752,651 and 4,310,440; all of which are incorporated by reference. Generally, the ELAPO molecular sieves are synthesized by hydrothermal crystallization from a reaction mixture containing reactive sources of EL, aluminum, phosphorus and a templating agent. Reactive sources of EL are the metal salts such as the chloride and nitrate salts. When EL is silicon, a preferred source is fumed, colloidal or precipitated silica. Preferred reactive sources of aluminum and phosphorus are pseudo-boehmite alumina and phosphoric acid. Preferred templating agents are amines and quaternary ammonium compounds. An especially preferred templating agent is tetraethylammonium hydroxide (TEAOH). These ELAPO materials are known to catalyze both the direct conversion of oxygenates to light olefins and the interconversion of olefins to a desired product olefin as can be seen from the combined teachings of U.S. Pat. Nos. 4,677,243 and 4,527,001. A good dual-function ELAPO catalyst for regeneration by means of the present invention is one in which the element (EL) content of the ELAPO varies from about 0.005 to about 0.05 mole fraction. If EL is more than one element, then the total concentration of all the elements is between about 0.005 and 0.05 mole fraction. An especially preferred catalyst is one in which EL is silicon (usually referred to as SAPO). The SAPOs which can be used are any of those described in U.S. Pat. Nos. 4,440,871; 5,126,308, and 5,191,141. Of the specific crystallographic structures described in the '871 patent, the SAPO-34, i.e., structure type 34, is preferred. The SAPO-34 structure is characterized in that it adsorbs xenon but does not adsorb isobutane, indicating that it has a pore opening of about 4.2 Å. Another SAPO, SAPO-17, as exemplified in Examples 25 and 26 of the '871 patent, is also preferred. The SAPO-17 structure is characterized in that it adsorbs oxygen, hexane, and water but does not adsorb isobutane, indicating that it has a pore opening of greater than about 4.3 Å and less than about 5.0 Å.

A particularly preferred coke-containing catalyst for regeneration by means of the present is a highly siliceous ZSM-5 or ZSM-11 type of material having a silica to alumina framework mole ratio of about 150 to 800:1 and most preferably about 400:1 to 600:1.

These types of catalysts are preferably formulated by incorporating the molecular sieve ingredient into porous solid particles in which the molecular sieve catalyst is present in an amount effective to promote the desired reactions such as, for example, the OTP reactions. In one aspect, the porous solid particles comprise a catalytically effective amount of the molecular sieve catalyst and at least one matrix material, preferably selected from the group consisting of binder materials, filler materials, and mixtures thereof to provide a desired property or properties, e.g., desired catalyst dilution, mechanical strength, and the like to the solid particles. Such matrix materials are porous in nature and may or may not be effective to help promote the desired conversion. Filler and binder materials include, for example, synthetic and naturally occurring substances such as metal oxides, clays, silicas, aluminas, silica-aluminas, silica-magnesias, silica-zirconias, silica-thorias, silica-berylias, silica-titanias, silica-alumina-thorias, silica-alumina-zirconias, aluminophosphates, mixtures of these and the like.

If matrix materials, e.g., binder and/or filler materials, are included in the catalyst composition, the non-zeolitic and/or zeolitic molecular sieve catalyst preferably comprise about 1% to 99%, more preferably about 5% to about 90% and still more preferably about 5% to about 50%, by weight of the total composition. The preparation of solid particles comprising molecular sieve catalyst and matrix materials is conventional and well known in the art. In order to facilitate movement of the coke-containing catalyst through the moving bed regenerator of the present invention, it is highly preferred that the particles of the catalyst be spherical or near spherical in shape. The diameter of these catalyst particles is preferably selected from the range of about 0.5 to 7 mm (0.02 to 0.28 in) with best results usually obtained with spherical particles that have a effective diameter of about 1.6 mm (0.063 in).

One preferred coke-containing catalyst that is suitable for regeneration by means of the present invention has the preferred molecular sieve ingredient incorporated or dispersed into a phosphorus-modified alumina matrix containing labile phosphorus and/or aluminum anions in amounts selected to form hydrothermally stabilized porous solid particles. The relative amounts of molecular sieve to this phosphorus-modified alumina matrix material is preferably set so that the molecular sieve ingredient is present in an amount corresponding to about 10 to 75 wt-% of the particles with the balance being this unique alumina matrix. Best results are ordinarily obtained when the molecular sieve portion constitutes about 50 to 70 wt-% of the resulting catalyst particles. In order to facilitate movement of the resulting dual-function catalyst through to moving bed regeneration apparatus it is highly preferred that these particles have a spherical or more near spherical in shape. The diameter of these catalyst particles is preferably selected from the range specified hereinbefore.

An essential feature of the novel regeneration apparatus and method of the present invention is that it incorporates a selective CO oxidation catalyst within a CO oxidation zone which is an integral part of the moving bed regeneration apparatus. The CO oxidation catalyst chosen for this application must be able to handle large volumes of flue gas with very minimal pressure drop in view of the placement of this CO oxidation catalyst zone in the flue gas collection zone of the apparatus. There are two types of catalyst systems known to the art that are uniquely capable of handling this type of duty. The first of these is a honeycomb ceramic or honeycomb metallic monolith coated with a surface layer containing a catalytically amount of a CO oxidation promoter. Preferred ceramic honeycomb carriers are made of, for example, cordierite, mullite, α-alumina, zirconia, titania, titanium phosphate, aluminum titanate, petalite, spodumene, aluminosilicates, and magnesium silicate. A ceramic honeycomb carrier of cordierite is especially preferred for use in the instant moving bed regeneration apparatus. Monolithic honeycomb metallic carriers produced from oxidation-resistant heat-resistant metals such as stainless steel and Fe—Cr—Al—Y alloy may also be used. These monolithic carriers are typically produced by an extrusion method, or a method involving wrapping and solidifying a sheet-like material. The shape of the gas passages of such carriers (the cell shape) may be various, for example hexagonal, tetragonal, triangular, or corrugated. The cell density (the number of cells/unit cross-sectional area) is usually 323 to 387/cm$^2$ (50 to 600/inch$^2$).

Active alumina having a specific surface area of 50 to 180 m$^2$/g is preferred as the active alumina coating used with these monolith carriers. Of these active alumina in γ and δ crystal forms having a specific surface area of 70 to 160 m$^2$/g are especially preferred. The active alumina is deposited in an amount of 50 to 200 g per liter of the finished catalyst and is preferably added to the carrier material by dip coating.

The CO oxidation promoter which is impregnated into or deposited on the active alumina coating or washcoat of this type of honeycomb monolithic catalyst is preferably chosen from the CO oxidation promoters known to the art. These known promoters are primarily metallic and include noble metals such as platinum, rhodium, palladium, iridium, ruthenium, osmonium and mixtures thereof and base metals such as chromium, iron, nickel, vanadium, copper, cobalt, manganese, zirconium and mixtures thereof. The amount of CO oxidation promoter added to this alumina washcoated monolithic support is specified broadly as a catalytically effective amount which typically encompasses an amount of one or more of the specified metallic promoters in an amount sufficient to provide a final catalytic composite containing these CO oxidation promoters in an amount calculated on an elemental basis of about 0.001 to about 2 wt-% or more. It is well known to those of skill in this CO oxidation art that the turnover numbers and kinetics associated with this catalytic CO oxidation reaction are such that the lower amounts of CO oxidation promoters typically are sufficient so that an amount of about 0.0001 to about 0.25 gives excellent results.

The second type of CO oxidation catalyst for use in the moving bed regeneration apparatus and method of the present invention is one comprising a fixed bed of particles of a catalytic composite comprising a combination of catalytically effective amounts of a CO oxidation promoter with a porous carrier material. The porous carrier material for use in this second type of CO oxidation catalyst can be any of the refractory materials known to those of skill in the fixed bed catalyst formulation art as being suitable for this service. Suitable porous carrier material will generally have a surface area of 10 to 50 m$^2$/g and include the following materials: 1) silica, silica gel, clays and silicates including those synthetically prepared and naturally occurring, which may or may not be acid treated, for example, attapulgus clay, china clay, diatomaceous earth, fuller's earth, kaolin, bentonite, kieselguhr, etc.; 2) refractory inorganic oxides such as alumina, titanium dioxide, zirconium dioxide, chromium oxide, beryllium oxide, vanadium oxide, cesium oxide, hafnium oxide, zinc oxide, magnesia, boria, thoria, silica-alumina, silica-magnesia, chromia-alumina, alumina-boria, silica-zirconia, etc.; 3) spinels, such as zinc aluminate, magnesium aluminate, calcium aluminate, etc.; and 4) combinations of materials from one or more of these groups. The preferred porous carrier material for use in the fixed bed embodiment of the CO oxidation catalyst are refractory inorganic oxides, with best results obtained with an alumina material.

Suitable alumina materials are the crystalline aluminas known as gamma-, eta- and theta-alumina, with gamma- or eta-alumina giving best results. In addition, in some embodiments, the alumina carrier material may contain other well known refractory inorganic oxides such as silica, zirconia, magnesia, etc.; however, the preferred catalyst is substantially pure gamma- or eta-alumina. Preferred catalysts have an apparent bulk density of about 0.3 to about 0.9 g/cc and surface area characteristics such that the average pore diameter is about 20 to 300 angstroms, the pore volume is about 0.1 to 1 cc/g and the surface area is about 100 to about 500 m$^2$/g. In general, best results are typically obtained with a gamma-alumina carrier material which is used in the form of spherical particles having: a relatively small diameter of about 1 to 20 mm (0.04 to 0.79 inch) an apparent bulk density of about 0.3 to 0.8 g/cc, a pore volume of about 0.4 ml/g, and a surface area of about 150 to 250 m$^2$/g.

This second type of CO oxidation catalyst can be prepared by adding a catalytically effective amount of one or more of the CO oxidation promoters specified hereinbefore to the porous carrier material utilizing any technique for metal addition known to those skilled in the catalyst preparation art. The preferred technique involves preforming the porous carrier material in particulate form having an effective diameter of about 1 to 20 mm (0.02 to 0.79 in) with best results usually obtained with spherical or cylindrical particles having a diameter of about 1.5 to 10 mm (0.06 to 0.4 in). The preferred preparation technique involves adding one or more of the CO oxidation promoters previously characterized to this performed porous carrier material in amounts that are catalytically effective as previously explained. The CO oxidation component can be added by impregnation or spraying one or more of these CO oxidation promoters on the perform porous carrier material and in the case where multiple CO oxidation promoters are used the impregnation and/or spraying can be performed either sequentially or simultaneously. Impregnation techniques that can be used include vacuum, evaporative, DIP and combinations of these techniques. It is to be noted that it is within the scope of the present invention to use a "skin" or "outer shell" impregnation technique in order to concentrate the CO oxidation promoter on or near the perimeter of the porous support. The resulting impregnated or sprayed porous support will then be dried at a temperature of about 50° to 200° C. and typically calcined in air at a temperature of about 250° to 750° C. for a period of about 5 to 100 hours.

DETAILED DESCRIPTION OF THE DRAWINGS

Figure 2:
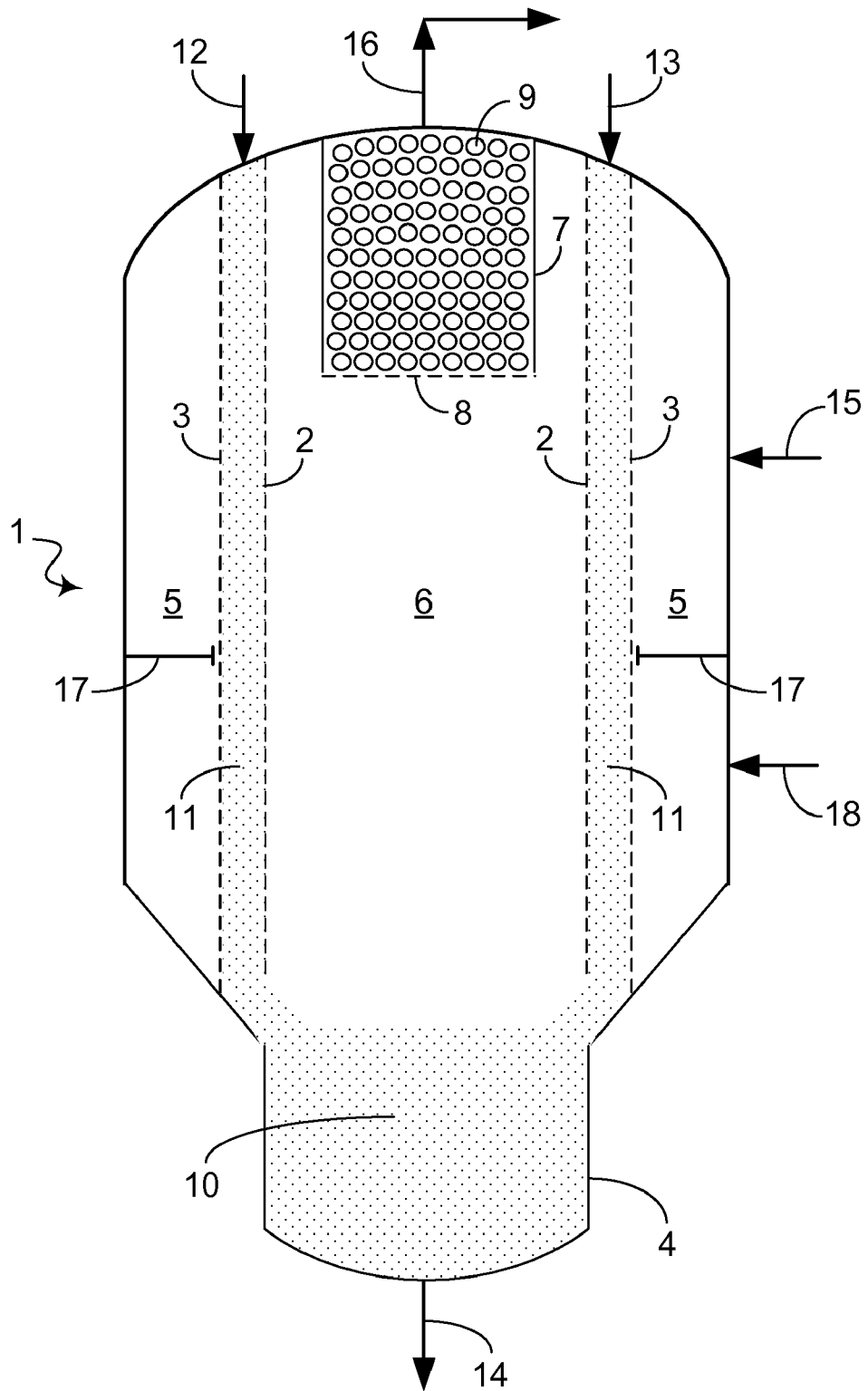
FIG. 2 on the other hand is a sectional and elevational view of the moving bed regeneration apparatus of the present invention in a highly preferred embodiment in which the coke combustion zone comprises two stages each of which has its own supply of combustion gas charged thereto. These figures portray the essential interconnection and interrelation between the various elements and zones utilized in the moving bed apparatus of the present invention in order to regenerate or reactivate a stream of coke-containing catalysts charged thereto and to produce an effluent flue gas stream that does not contain hazardous amounts of CO.

The following description of two highly preferred embodiments of the apparatus of the present invention is made with reference to the apparatus described in FIGS. 1 and 2 of the attached drawings. In the interest of simplifying the description of the two preferred embodiments of the present in invention shown in FIGS. 1 and 2, these figures do not contain representations of convention elements such as heaters, heat exchangers, coolers, valves, control means, inlet and outlet conduits and other conventional items that are well known to those of ordinary skill in the chemical engineering art except where the presence of a particular element is essential to the understanding of the present invention.

Referring now to FIG. 1, there is shown an elevational cross-sectional schematic of the moving bed regeneration apparatus of the present invention. In the particular case illustrated in FIG. 1, the coke combustion zone contains only one stage wherein a downwardly moving bed of coked catalyst is contacted with a combustion gas stream containing a relatively small amount of oxygen of about 0.5 to about 2 vol-% in admixture with one or more inert gases. The moving bed regeneration apparatus illustrated in FIG. 1 comprises a vertically elongated cylindrical confined regeneration vessel 1 having in the upper region thereof an inner cylindrical screen 2 and an outer cylindrical screen 3 concentrically and vertically situated about the axis thereof to form an annularly shaped coke combustion zone 11. The holes in the inner screens 2 and outer screens 3 are sized to retain particles of coke-containing catalyst charged to this vessel for regeneration in this annular combustion zone while allowing contact with a radially flowing combustion gas which typically flows across this annular coke combustion zone 11 from the outer screen 3 and traverses the particles of coke-containing catalyst contained in annular coke combustion zone 11 and then is withdrawn through inner screen 2. Outer screen 3 is spaced apart from the inner wall of regeneration vessel 1 to form an annular shape combustion gas distribution zone 5 which typically acts to distribute the combustion gas along outer screen 3. Inner screen 2 on the other hand is of a diameter sufficient to define a flue gas collection zone 6 in the interior space thereof which is designed to collect the flue gas stream that traverses the coke combustion zone and facilitate its withdrawal. In FIG. 1, a cylindrical regenerated catalyst disengagement zone 4 is shown as situated in the lower region of regeneration vessel 1. This regenerated catalyst disengagement zone 4 has a diameter not greater than the diameter of the outer screen 3 and is in open communication with the lower end of the annular coke combustion zone 11 in the manner illustrated in the drawing to form a cylindrically shaped moving bed of regenerated catalyst particles 10 that is not in direct communication with combustion gas distribution zone 5, thereby enabling disengagement of the catalyst particles from the combustion gas and the flue gas. Although it is not illustrated in the attached FIG. 1, this regenerated catalyst disengagement zone 4 may contain one or more stripping gas inlet conduits along with associated distribution means such as a perforated conduit or a ring of perforated conduits located in the bottom region of this disengagement zone in order to strip any CO-containing flue gas material that may be entrained or adsorbed on the regenerated catalyst particles that comprise moving bed 10. In most cases, separation of the CO-containing flue gas material as well as any residual combustion gas from the moving bed of regenerated catalyst particles 10 in regenerated catalyst disengagement zone 4 is relatively easily accomplished since the components of these gas streams do not have a high affinity for the regenerated catalyst particles. Moving bed regeneration vessel 1 also contains one or more coked catalyst inlet conduits in open communication with the upper region of annular coke combustion zone 11. Two of these coked catalyst inlet conduits are illustrated in FIG. 1 as elements 12 and 13. The number of coke inlet conduits utilized in actual practice is typically about 6 to 12 or more conduits in order to provide an even distribution of the coked catalyst into annular coke combustion zone 11. Regeneration vessel 1 will also contain at least one primary combustion gas inlet conduit in fluid communication with the combustion gas distribution zone 5. In FIG. 1, the primary combustion gas inlet conduit is illustrated as element 15 and once again there may be a plurality of these combustion inlet conduits in order to facilitate good distribution of the combustion gas in the combustion gas distribution zone 5.

The lower region of regenerated catalyst disengagement zone 4 will contain one or more regenerated catalyst outlet conduits 14 in open communication with the bottom region of the cylindrical moving bed of regenerated catalyst particles 10 that is formed in the regenerated catalyst disengagement zone 4.

Flue gas collection zone 6 has a CO oxidation zone 7 disposed in the upper region thereof. This CO oxidation zone 7 contains an inlet screen 8 in fluid communication with flue gas collection zone 6, thereby providing a flow path for the CO-containing flue gas material accumulated in zone 6 to enter CO oxidation zone 7. FIG. 1 illustrates CO oxidation zone 7 as containing a fixed bed of CO oxidation catalyst 9 comprising a combination of catalytically effective amounts of one or more CO oxidation promoters with relatively large particles of a porous carrier material. This type of CO oxidation catalyst system was previously characterized in some detail. In accordance with the present invention, it acts to autogenously remove hazardous amounts of CO material from the flue gas stream entering CO oxidation zone 7 via inlet screen 8. Lastly a regeneration vessel 1 contains in the upper region thereof a flue gas outlet conduit 16 which is in fluid communication only with the upper region of the CO oxidation zone 7, thereby providing an exclusive flue gas outlet flow path that allows essentially all of the flue gas collected in zone 6 to traverse CO oxidation zone 7 and the fixed bed of CO oxidation catalyst 9 contained therein prior to exiting moving bed regeneration vessel 1.

Turning now to FIG. 2, it illustrates a moving bed regeneration vessel which is quite similar in configuration to the apparatus described in FIG. 1 with the exception of element 17. Element 17 is an imperforate ring plate that is situated in combustion gas distribution zone 5 in such a manner as to divide zone 5 into an upper and a lower region. FIG. 2 also shows primary combustion gas inlet conduit 15 as the source for combustion gas for the upper region of zone 5. Likewise, combustion gas inlet conduit 18 provides a secondary combustion gas stream that flows exclusively into the lower region of combustion gas distribution zone 5 (i.e. the region below imperforate ring plate 17) to thereby provide a second stage of coke combustion for the coke-containing catalyst charged via catalyst inlet conduits 12 and 13 to the regeneration apparatus illustrated in FIG. 2. The principal advantage of dividing annular coke combustion zone 11 in two stages is that the length of this annular coke combustion zone 11 can be considerably shortened if a relatively higher amount of oxygen is contained in the secondary combustion gas stream injected into the lower region of zone 5 via secondary combustion gas inlet conduit 18. The amount of oxygen contained in the primary combustion gas injected into the upper region of combustion gas distribution zone 5 is typically about 0.5 to about 2 vol-% in order to control the temperature excursion that the coke-containing catalyst experiences in passage through the upper region of annular coke combustion zone 11. Once the coke level on the catalyst is diminished to levels less than about 50% of the coke level on the catalyst entering regeneration vessel 1 via catalyst inlet conduits 12 and 13, however, the partially regenerated catalyst which passes into the lower region of annular coke combustion zone 11 can be exposed to much higher levels of oxygen, such as a secondary combustion gas containing about 2 to 21 vol-% of oxygen, without experiencing detrimental temperature excursions that can cause hydrothermal deactivation of the active ingredients of the catalyst undergoing regeneration.

In both FIGS. 1 and 2, the particles of coked catalyst that are undergoing regeneration are represented by the dotted areas in zones 11 and 10. A key design feature of the annular coke combustion zone 11 is the distance between the inner screens 2 and outer screens 3 which sets the depth of the coke combustion zone. It has been established that good results are achieved in this annular coke combustion zone 11 if the difference in diameters between the outer screens 3 and inner screens 2 is sufficient to provide a moving bed of about 15.2 to 45.7 cm (6 to 18 in) with best results obtained with a bed resulting diameter of about 15.2 to 30.5 cm (6 to 12 in). Similarly the diameter and gross pore area of the inner screen 2 of the apparatus illustrated in FIGS. 1 and 2 must be of sufficient magnitude to limit the velocity of the combustion gases flowing through inner screen 2 to a value of about 1 to 50 cm/sec (0.3 to 1.64 ft/sec) at maximum design gas hourly space velocity (GHSV) which is defined as the total volume per hour of combustion gas entering regeneration vessel 1 measured at inlet conditions divided by the total volume of particles of coke-containing catalyst occupying annular coke combustion zone 11. The diameter of the inner screen 2 must therefore be set at a value which at a GHSV of less than 10,000 $hr^{-1}$, more preferably a value of about 3,000 to 7,000 $hr^{-1}$ will ensure that the coke-containing catalyst will move freely in and through annular coke combustion zone 11 without any risk of pinning to the inner screen 2 which can severely retard catalyst circulation through annular coke combustion zone 11 by causing a layer of catalyst to build up on the outside surface of inner screen 2.

In accordance with the regeneration method of the present invention, the moving bed regeneration apparatus described in FIG. 1 is used to regenerate a stream of coke-containing catalyst that does not contain a CO oxidation promoter of the types that have been previously characterized herein. The stream of coke-containing catalyst to be regenerated is withdrawn from the reactor side of the unit which is not illustrated in FIG. 1. Generally the reactor side will operate by using a moving bed of the catalyst for a period of time sufficient to experience some catalyst deactivation due to coke deposition on the active sites of the catalyst. Using well established moving bed procedures for transferring a stream of catalyst particles from the reactor to the regenerator, a stream of coke-containing catalytic particles are continuously or in some cases intermittently removed from the reaction zone and transferred downward into a lift-engaging vessel of conventional design. In accordance with moving bed design principals, this catalyst transfer is by the action of gravity. Fluidization gas such as steam, nitrogen or other inert gas is supplied to this lift-engaging vessel that is located under the reactor and used to effect the transfer of coke-containing catalyst to an elutriation and disengagement vessel, not shown in the attached FIG. 1 located above regeneration vessel 1, wherein catalyst finds and lift gas are separated from the coke-containing catalyst that is to undergo regeneration. The coke-containing catalyst particles are then transferred downward from the disengaging vessel located above moving bed regeneration vessel 1 through a plurality of coked catalyst inlet conduits such as conduits 12 and 13 which are designed to evenly distribute the coked catalyst into the annular coke combustion zone 11 of regeneration vessel 1.

The particles of coke-containing catalyst are confined as a dense compact mass within annular coke combustion zone 11 with each catalyst particle resting upon catalyst particles below it. The catalyst particles gradually move downward and form an annular moving bed of coke-containing catalyst which is illustrated in FIG. 1 as the dotted area between outer screen 3 and inner screen 2. The coked catalyst particles are charged via the coked catalyst inlet conduits at a rate that corresponds to a residence time in annular coke combustion zone 11 sufficient to burn off 50 to 100% of the coke deposits. Simultaneously with passage of the coke-containing catalyst into regeneration vessel 1, a combustion gas stream is charged thereto via primary combustion gas inlet conduit 15. This combustion gas stream is distributed around the circumference of outer screen 3 in combustion gas distribution zone 5. This combustion gas stream will ordinarily contain a relatively low amount of oxygen comprising about 0.5 to about 2 vol-% and more typically will contain an amount of oxygen of about 0.5 to about 1.5 vol-%. The balance of the combustion gas stream will ordinarily be comprised of an inert gas such as nitrogen or a recycled flue gas stream that has been treated in the manner which will be described below. The primary combustion gas stream will then flow radially through outer screen 3 into contact with the coke-containing catalyst under conditions which promote coke combustion. The combustion promoting conditions utilized in annular coke combustion zone 11 are first a temperature of about 350° to 650° C. or more (662° to 1202° F.) and more typically at a temperature in the coke combustion zone of about 450° to 550° C. (842° to 1022° F.). As the combustion gas flows radially through annular coke combustion zone 11, coke combustion is initiated with the production of combustion products which are primarily $CO_2$, CO and $H_2O$. Accompanying the coke combustion reactions is a significant exotherm which increases the temperature of the resulting gas stream as it traverses the moving bed of coke-containing catalyst particles contained within annular coke combustion zone 11. This release of heat energy causes a temperature differential to occur between outer screen 3 and inner screen 2 and ordinarily the depth of the moving bed of coke-containing catalyst is held to a value as previously explained that helps control this temperature differential to a value which is less than 80° C. and more preferably less than 50° C. The stream of regenerating gas entering regeneration vessel 1 via combustion gas inlet conduit 15 is preferably maintained at a pressure of about 170 to 1825 kPa (10 to 250 psig) and even more preferably at a pressure of about 204 to 446 kPa (15 to 50 psig) which is ordinarily sufficient to provide sufficient force to this combustion gas stream that it can overcome the pressure drop experienced as it flows through regeneration vessel 1 from combustion gas inlet conduit 15 to flue gas outlet conduit 16. As indicated hereinbefore, the gas hourly space velocity utilized in combustion zone is ordinarily set at a value less than 10,000 $hr^{-1}$ with a preferred value being about 3,000 to 7,000 $hr^{-1}$. Operating the annular coke combustion zone 11 at these conditions allows a hot flue gas stream to be withdrawn through inner screen 2 into flue gas collection zone 6 of regeneration vessel 1. This flue gas stream contains the combustion products of the coke burning that occurs within this combustion zone as well as unreacted oxygen and the inert ingredients originally present in the combustion gas stream which entered zone 5 via combustion gas inlet conduit 15. The focus of the present invention is on the fact that this flue gas stream will contain significant amounts of CO such that if it was released into the environment it would constitute a hazardous material. In accordance with the present invention, substantially all of the resulting CO-containing flue gas withdrawn through inner screen 2 into flue gas collection zone 6 is passed via inlet screen 8 into the CO oxidation zone 7 which is situated in the upper region of regeneration vessel 1 as illustrated in FIGS. 1 and 2. CO oxidation zone 7 contains fixed bed of a CO oxidation catalyst which comprises relatively large particles of a catalyst comprising a catalytically effective amount of a CO oxidation promoter selected from the group specified hereinbefore supported on a porous carrier material which is preferably alumina as indicated above. The CO containing flue gas stream then traverses this fixed bed of CO oxidation catalyst as it moves through CO oxidation zone 7 to reach effluent flue gas outlet conduit 16 where it exits from regeneration vessel 1. CO oxidation zone 7 is operated at CO oxidation conditions which are quite close to the coke combustion conditions maintained in annular coke combustion zone 11 with suitable allowances for the increase in temperature across annular coke combustion zone 11, the drop in pressure associated with flow through annular coke combustion zone 11 and at a GHSV based on volume of flue gas entering fixed bed of CO oxidation catalyst 9 via inlet screen 8 as determined using the stoichiometry associated with the coke combustion reactions occurring in annular coke combustion zone 11 divided by the volume of the fixed bed of CO oxidation catalyst 9 maintained within CO oxidation zone 7. The preferred GHSV used in CO oxidation zone 7 is about 1,000 to 10,000 $hr^{-1}$ with a value of about 2,000 to 8,000 $hr^{-1}$ giving excellent results with a fixed bed catalyst containing about 0.25 wt-% platinum dispersed on the preferred alumina porous material previously characterized. The effluent flue gas stream withdrawn from CO oxidation zone 7 via flue gas outlet conduit 16 will only contain innocuous amounts of CO in view of the fact that the fixed bed of CO oxidation catalyst 9 maintained within CO oxidation zone 7 operates autogenously under the high temperature conditions generated by the exothermic reaction occurring in annular coke combustion zone 11 to convert at least 95 mol-% of the entering CO to $CO_2$.

A preferred practice associated with the regeneration method of the present invention is to vent off a portion of this effluent flue gas stream withdrawn via flue gas outlet conduit 16 in order to remove the net combustion products formed within an annular coke combustion zone 11. The remaining portion of this effluent flue gas stream then passes into a compressive means (not shown in FIGS. 1 or 2) and is compressed to a pressure sufficient to overcome the pressure drop experienced in regeneration vessel 1 and the resulting compressed flue gas stream is preferably passed into a cooling zone, again not shown in the attached FIGS. 1 or 2, wherein it is cooled to a temperature of about 50° to 100° C. by conventional indirect heat exchange. The resulting compressed and cooled effluent flue gas stream is then passed into a suitable drying zone (not shown in the attached FIGS. 1 and 2) where conventional adsorptive drying is utilized to remove at least 50% or more of the water content thereof in order to control the water content of the effluent flue gas stream to a level which is not detrimental to the preferred molecular sieve content of the coke-containing catalyst that is regenerated therein. The resulting pressurized cooled and dried portion of the effluent flue gas stream is thereafter admixed with an air stream in an amount sufficient to provide the necessary oxygen content specified above for the combustion gas stream. The resulting mixture of these two gas streams is then recycled to the combustion zone as the combustion gas stream entering by means of combustion gas inlet conduit 15. It is to be noted that during startup of regeneration vessel 1, this combustion gas circuit will contain a suitable heating means to enable to combustion gas stream being recirculated by this flue gas circuit to heat the coke-containing catalyst particles to a temperature which will support combustion of coke present thereon and thereafter this heating means is blocked off once coke combustion in annular coke combustion zone 11 becomes self-sustaining.

As illustrated in FIGS. 1 and 2, the inner screen 2 is situated to allow the regenerated catalyst particles to move into the lower region of regeneration vessel 1 which is shown in FIGS. 1 and 2 as regenerated catalyst disengagement zone 4. A cylindrical moving bed 10 of regenerated catalyst forms in regenerated catalyst disengagement zone 4 and is held in zone 4 for an amount of time sufficient to disengage the regenerated catalyst from both the combustion gas stream present in zone 5 and the flue gas stream formed in zone 6, thereby freeing the regenerated catalyst from any hazardous amount of CO and allowing its withdrawal via outlet conduit 14. As pointed out hereinbefore, additional stripping gas inlets can be provided in regenerated catalyst disengagement zone 4 to aid the removal of CO from the regenerated catalyst if the dwell time in regenerated catalyst disengagement zone 4 is not sufficient to accomplish this objective.

FIG. 2 illustrates a two-stage combustion zone which operates in a manner quite similar to that described above for FIG. 1 with the exception that imperforate ring plate 17 acts to divide combustion gas distribution zone 5 into an upper and lower section. Since the flow of combustion gas across outer screen 3 into the annular coke combustion zone 11 is primarily radial flow, imperforate ring plate 17 also acts to divide the annular coke combustion zone 11 into an upper and lower portion. The configuration then of the upper and lower combustion gas distribution zone 5 and the annular coke combustion zone 11 shown in FIG. 2 provides the opportunity to use a secondary combustion gas stream charged via combustion gas inlet conduit 18 to accelerate the residual burning of coke, thereby considerably shortening the length of annular coke combustion zone 11. This is illustrated in FIG. 2 with primary combustion gas inlet conduit 15 being charged with a primary combustion gas stream whose composition is quite similar to the combustion gas stream utilized in combustion gas inlet conduit 15 of FIG. 1. Also described in FIG. 2 is a secondary combustion gas inlet conduit 18 which can be utilized to charge a secondary combustion gas stream which has an oxygen content of about 2 to 21 vol-%. This secondary gas combustion stream is then distributed in the lower region of combustion gas distribution zone 5 and flows through the lower region of annular coke combustion zone 11 at secondary coke combustion conditions similar to those utilized in the upper section except that a temperature at least 10° C. higher than that used in the upper section of annular coke combustion zone 11 is used in the lower section, thereby accelerating residual coke combustion from the catalyst which passes via gravity flow from the upper section to the lower section of annular coke combustion zone 11. The upper section of annular coke combustion zone 11 operates at the conditions previously given for this zone in the discussion of FIG. 1. The resulting two-stage operation of annular coke combustion zone 11 illustrated in FIG. 2 can be used to shorten the height of annular coke combustion zone 11 by a factor of 1.5 to 4 relative to the single-stage combustion zone illustrated in FIG. 1 for the same desired degree of coke deposit removal from a stream of coke-containing catalyst particles charged to regeneration vessel 1.

The operation of the regeneration vessel illustrated in FIG. 2 would in all other respects be quite similar to that previously described for the single-stage regeneration vessel of FIG. 1 with the exception that the effluent flue gas stream withdrawn from regeneration vessel 1 via flue gas outlet conduit 16 would be handled in a slightly different manner. After the second portion of the effluent gas stream is compressed, cooled and dried in the manner specified above with respect to the description of FIG. 1, it would be further subdivided into a second and third portion which in turn would be admixed with sufficient quantities of air to meet the oxygen requirements for the primary and secondary combustion gas streams specified above. In all other respects, the operation of the regeneration vessel shown in FIG. 2 would track the operation previously explained for the single-stage regeneration vessel illustrated in FIG. 1.

The invention claimed is:

1. A method for continuously regenerating particles of a coke-containing catalyst that does not contain a CO oxidation promoter, the method comprising the steps of:
    a) charging particles of the coke-containing catalyst to at least one coked catalyst inlet conduit in communication with an upper end of a combustion zone of a moving bed regeneration apparatus, wherein the apparatus comprises a vertically elongated regeneration vessel comprising
        (i) concentric inner and outer screens in an upper region of the vessel, forming the combustion zone between the screens, a combustion gas distribution zone between the outer screen and an inner wall of the vessel, and a flue gas collection zone in an interior space of the inner screen;
        (ii) a catalyst disengagement zone in a lower region of the vessel and in communication with a lower end of the combustion zone;
        (iii) at least one primary combustion gas inlet conduit in communication with the combustion gas distribution zone;
        (iv) a regenerated catalyst outlet conduit in a bottom region of the catalyst disengagement zone;
        (v) a CO oxidation zone containing a catalytically effective amount of a CO oxidation catalyst in an upper region of the flue gas collection zone and having an inlet in communication with the flue gas collection zone; and
        (vi) a flue gas outlet conduit in the upper region of the vessel and in communication with the CO oxidation zone,
    wherein the particles of the coke-containing catalyst are charged at a rate that corresponds to a residence time in the combustion zone sufficient to burn off 50 to 100% of the coke deposits;
    b) passing a combustion gas stream containing about 0.5 to 2.0 vol-% oxygen in admixture with inert gases into the primary combustion gas inlet conduit at a rate sufficient to provide sufficient oxygen to burn coke off the catalyst;
    c) distributing the combustion gas stream in the combustion gas distribution zone and passing the combustion gas into the combustion zone so that it flows radially across the moving bed of catalyst at coke combustion conditions including a temperature of about 350° to 650° C. (662° to 1202° F.) or higher sufficient to sustain coke combustion;
    d) withdrawing a flue gas containing undesired amounts of CO from the combustion zone into the flue gas collection zone and passing substantially all of the resulting CO-containing flue gas into the inlet of the CO oxidation zone and therein contacting the CO-containing flue gas with the CO oxidation catalyst at CO oxidation conditions effective to convert at least 95 mol-% of the entering CO to $CO_2$ and to form an effluent flue gas stream containing only innocuous amounts of CO and withdrawing the effluent flue gas stream via the flue gas outlet conduit; and
    e) withdrawing regenerated catalyst particles from the combustion zone and passing them into the catalyst disengagement zone wherein they are disengaged from contact with the radially flowing combustion gas and recovering regenerated catalyst particles from the regenerated catalyst outlet conduit.

2. The method as defined in claim 1 wherein the combustion gas stream is prepared by mixing at least a portion of the effluent flue gas stream with an air stream in amounts selected to result in the combustion gas stream containing about 0.5 to 2.0 wt-% oxygen.

3. The method as defined in claim 1 wherein the effluent flue gas stream is divided into two portions and the first portion is vented in an amount sufficient to remove the net combustion products, wherein the second portion is pressurized in a compressor means to a pressure sufficient to overcome pressure drop in the moving bed regeneration apparatus, wherein the resulting pressurized second portion is cooled in a cooling means and passed to a drying means to remove at least 50% of the water contained therein, wherein the resulting dried second portion of the effluent flue gas stream is admixed with an air stream in amounts sufficient to raise the oxygen content to a value of about 0.5 to 2.0 wt-% and wherein the resulting mixed gas stream is recycled to the moving bed regeneration apparatus to form a flue gas circulation circuit and to provide the combustion gas stream used in step b).

4. The method as defined in claim 3 wherein during start-up a blend of an inert gas stream such as nitrogen with an air stream is circulated through the flue gas circulation circuit around the moving bed regeneration apparatus, wherein a start-up heater is inserted in this flue gas circuit to raise the temperature of the circulating gas stream to a value sufficient to initiate and sustain the combustion of coke and wherein the start-up heater is blocked off and shut-down when exothermic coke combustion is established in the coke combustion zone.

5. The method of claim 4, wherein, in the regeneration vessel of the moving bed regeneration apparatus, the primary combustion gas inlet conduit is in communication with an upper section of the combustion gas distribution zone and the regeneration vessel further comprises a secondary combustion gas inlet conduit in communication with a lower section of the combustion gas distribution zone, the method comprising the steps of:

a) charging particles of the coke-containing catalyst to the coked catalyst inlet conduit at a rate that corresponds to a residence time in the annular combustion zone sufficient to burn off 50 to 100% of the coke deposits;

b) passing a first combustion gas stream containing about 0.5 to 2.0 vol-% oxygen in admixture with inert gases into the primary combustion gas inlet conduit at a rate sufficient to provide sufficient oxygen to burn a significant portion of the coke off the catalyst;

c) distributing the first combustion gas stream in the upper section of the combustion gas distribution zone and passing the gas into an upper section of the combustion zone so that it flows radially across the moving bed of catalyst at primary coke combustion conditions including a temperature of about 350° to 650° C. (662° to 1202° F.) or higher sufficient to sustain coke combustion;

d) passing a second combustion gas stream containing about 2 to 21 vol-% oxygen into the secondary combustion gas inlet conduit in an amount sufficient to complete the desired amount of coke removal from the catalyst and/or to provide additional oxygen to the CO combustion zone;

e) distributing the second combustion gas stream in the lower section of the combustion gas distribution zone and passing this stream into a lower section of the combustion zone so that it flows radially across the moving bed of catalyst at secondary coke combustion conditions including a temperature at least 10° C. higher than that used in the upper section of the combustion zone;

f) withdrawing a flue gas containing undesired amounts of CO from the combustion zone into the flue gas collection zone and passing substantially all of the resulting CO-containing flue gas into the inlet of the CO oxidation zone and therein contacting the CO-containing flue gas with the CO oxidation catalyst at CO oxidation conditions effective to convert at least 95 mol-% of the entering CO to $CO_2$ and to form an effluent flue gas stream containing only innocuous amounts of CO and withdrawing the effluent gas flue stream via the flue gas outlet conduit; and g) withdrawing regenerated catalyst particles from the combustion zone and passing them into the disengagement zone wherein they are disengaged from contact with the radially flowing first and second combustion gas streams and recovering regenerated catalyst particles from the regenerated catalyst outlet conduit.

* * * * *